(12) United States Patent
Kamatani

(10) Patent No.: US 6,178,264 B1
(45) Date of Patent: Jan. 23, 2001

(54) IMAGE CUTOUT METHOD AND APPARATUS

(75) Inventor: Kazuya Kamatani, Kyoto (JP)

(73) Assignee: Dainippon Screen Mfg. Co., Ltd., Kyoto (JP)

( * ) Notice: Under 35 U.S.C. 154(b), the term of this patent shall be extended for 0 days.

(21) Appl. No.: 09/166,907

(22) Filed: Oct. 6, 1998

(30) Foreign Application Priority Data

Oct. 31, 1997 (JP) .................................................... 9-300901

(51) Int. Cl.[7] .............................. G06K 9/36; G06K 9/40; G06K 9/48
(52) U.S. Cl. ........................ 382/199; 382/242; 382/243; 382/266; 382/268; 382/269
(58) Field of Search .................................... 382/163, 181, 382/199, 235, 242, 243, 266, 268, 269

(56) References Cited

U.S. PATENT DOCUMENTS

| | | | |
|---|---|---|---|
| 5,038,383 | * | 8/1991 | Usumoto et al. .................... 382/235 |
| 5,091,967 | * | 2/1992 | Ohsawa ................................ 382/172 |
| 5,119,439 | * | 6/1992 | Osawa et al. ........................ 382/199 |
| 5,454,050 | * | 9/1995 | Nakabayashi et al. .............. 382/165 |
| 5,777,626 | * | 7/1999 | Takashima et al. ................. 345/443 |
| 5,949,431 | * | 9/1999 | Matsumura et al. ................. 345/435 |
| 5,974,175 | * | 10/1999 | Suzuki ................................. 382/199 |
| 5,999,651 | * | 12/1999 | Chang et al. ........................ 382/215 |

FOREIGN PATENT DOCUMENTS 63-5745   4/1988  (JP) .

* cited by examiner

Primary Examiner—Phuoc Tran
Assistant Examiner—Daniel G. Mariam
(74) Attorney, Agent, or Firm—McDermott, Will & Emery

(57) ABSTRACT

An object of the present invention is to provide an image cutout method capable of moving a nozzle on a photographic image along a contour of a subject and binarizing image data in the nozzle to obtain the contour line of the subject, and cutting out the image along the obtained contour line, and as a result, allowing efficient cutout without putting a load on an operator. To achieve the object, when the nozzle is moved, a direction for moving the nozzle is determined based on a partial contour line in the obtained present nozzle. Thus, it is possible to move the nozzle along the contour of the subject without operator's operation of a pointing device and the like.

5 Claims, 10 Drawing Sheets

IMAGE CUTOUT METHOD AND APPARATUS

BACKGROUND OF THE INVENTION

1. Field of the Invention

This invention relates to image cutout methods and apparatus, and more specifically to an image cutout method and apparatus for converting an image into data form for digital processing to cut out an image of a desired subject therefrom.

2. Related Art Statement

In recent years, the technology of digital image processing for converting an image into data form for digital processing has been widely used. Also in a field of a photomechanical process for making a printing plate including images, by introducing the technology of digital image processing, most works which had previously been done depending on workers' experiences and intuition were automated, and as a result it became possible to efficiently make a high quality plate even by workers without high skills.

"Cutout" is one of the processes in the photomechanical process. This is a process for cutting out a subject part from an original photographic image with a background. For example, this process is performed when a plate for a catalog or an advertising leaf let is made containing a photograph of a product. If this is done by hand, much expense in time and effort is required. Therefore, a method has been devised that the original photograph is read by a scanner to be converted in data form and the obtained image data is subjected to digital processing to be cut out.

The method is as follows, for example. That is, the image data is binarized with an appropriate reference color (for example, Y, M, C, K) and (positional information of) a boundary line where the obtained bit map is on/off is obtained. Then, only data inside the obtained boundary line is extracted. Thus, the image of the subject part can be cut out from the original image without tracing by an operator.

However, in the above method, it is possible to accurately cut out the image of the subject part when the subject (and the background) has a single-color or a color close thereto, while it is possible to obtain only part of the accurate contour line whichever color is selected for a reference color for binarization when a plurality of colors are included in the subject. For example, when a subject 1101 shaped like a human as shown in FIG. 11 is to be cut out, if the reference color is set based on a color of a body part 1101a, the accurate contour line cannot be obtained in a head part 1101b, and if the reference color is set based on a color of the head part 1101b, the accurate contour line cannot be obtained in the body part 1101a.

Thus, a new method as disclosed in Japanese Patent Publication (examined)63-5745 by the applicant has been suggested. That is, as shown in FIG. 12, the method is for setting a window frame (hereinafter referred to as a nozzle 1201) on a display screen and, with moving the nozzle 1201 along a contour of a subject, binarizing image data in the nozzle 1201. In this method, it is possible to obtain the accurate contour line of the entire subject 1101 by setting an appropriate reference color for each nozzle 1201 even when a plurality of colors are included.

By the way, in the embodiment shown in the above publication, an operator manually performs processing of moving the nozzle 1201 along the contour of the subject 1101. That is, the operator roughly traces the contour of the subject 1101, and from the approximate contour part obtained thereby, a system side traces an accurate contour line.

Specifically, in FIG. 12, the operator first moves the nozzle 1201 to a cutout starting position and sets a reference color. In response, the system side binarizes the image data in the nozzle 1201 to perform processing for obtaining a partial contour line in the nozzle 1201. Next, the operator moves the nozzle 1201 in a direction shown by an arrow in the drawing along the contour of the subject 1101, and further changes the reference color as required. In response, the system side binarizes the image data in the nozzle 1201 after movement to perform processing for obtaining a next partial contour line. Thereafter, the operator and the system repeat the above operation and processing to obtain contour lines of the subject 1101 and the background.

In the above new method, if the processing of moving the nozzle 1201 along the contour of the subject 1101 is performed by the system side, it is possible to further reduce a load on the operator thus perform prepress more efficiently. However, in the above publication and any other publications, processing of automatically moving the nozzle 1201 is not disclosed.

This may be because it is not easy to automatically move the nozzle 1201 on the grounds as follows. That is, the operator can intuitively distinguish the subject 1101 from the background when looking at the photographic image shown in FIG. 12. However, the system side cannot distinguish which data belongs to the part of the subject 1101 and to the background part among the held image data. Thus, moving the nozzle 1201 along the contour of the subject 1101 is easy for the operator, but not for the system side because the system cannot recognize the contour.

SUMMARY OF THE INVENTION

Therefore, an object of the present invention is to provide an image cutout method and apparatus capable of automatically moving a nozzle when moving the nozzle on an image along a contour of a subject and binarizing image data in the nozzle to obtain the contour of the subject, and cutting out the image along the obtained contour line, and as a result, allowing efficient cutout without putting a load on an operator.

The present invention has the following features to solve the problem above.

A first aspect of the present invention is directed to a method for moving a window frame on an image along a contour of a subject and binarizing image data in the window frame to obtain a contour line of the subject, and cutting out an image along the obtained contour line, at a start of cutout, the window frame being at a position including part of the contour line of the subject, the method comprising the steps of:
reading and converting the image into image data;
obtaining a partial contour line of the subject in the window frame by binarizing the image data in the window frame among the image data obtained by conversion; and
determining a direction for moving the window frame based on the obtained partial contour line and moving the window frame along the determined direction.

As described above, in the first aspect, based on the obtained partial contour line in the present window frame, the direction for moving the window frame is determined. Therefore, it is possible to move the window frame along the contour of the subject without operator's operation of a pointing device and the like, and as a result, it is possible to efficiently perform cutout without putting a load on the operator.

According to a second aspect, in the first aspect,
at the start of cutout, the window frame is on the contour line of the subject, and
at the time of moving the window frame, the window frame is moved so that a center point of the window frame after movement is on one extreme point of the obtained partial contour line.

As described above, in the second aspect, the window frame is moved so that the center point of the window frame after movement is on one extreme point of the obtained partial contour line. Therefore, unlike in the case where a direction of a tangent of the obtained partial contour line is obtained and the window frame is moved along the direction, no complicated coordinate calculation is required and the window frame can be moved easily.

According to a third aspect, in the first aspect, the method further comprises the steps of:
zooming a partial area of the image including a part on which the window frame is put; and
determining a direction for moving the zoom area based on the obtained partial contour line and moving the area along the determined direction.

As described above, in the third aspect, also as to the area to be zoomed, based on the obtained partial contour line, the direction for moving the area is determined. Therefore, it is possible to move the area along the contour of the subject without operator's operation of a pointing device and the like.

A fourth aspect is directed to an image cutout apparatus for moving a window frame on an image along a contour of a subject and binarizing image data in the window frame to obtain a contour line of the subject, and cutting out an image along the obtained contour line,
at a start of cutout, the window frame being at a position including part of the contour line of the subject, the apparatus comprising:
image reading means for reading and converting the image into image data;
partial contour obtaining means for obtaining a partial contour line of the subject in the window frame by binarizing image data in the window frame among the image data obtained by reading by the image reading means; and
window frame moving means for determining a direction for moving the window frame based on the partial contour line obtained by the partial contour obtaining means and moving the window frame along the determined direction.

As described above, in the fourth aspect, based on the obtained partial contour line in the present window frame, the direction for moving the window frame is determined. Therefore, it is possible to move the window frame along the contour of the subject without operator's operation of a pointing device and the like, and as a result, it is possible to efficiently perform cutout without putting a load on the operator.

A fifth aspect is directed to a recording medium of recording a program for moving a window frame on an image along a contour of a subject and binarizing image data in the window frame to obtain a contour line of the subject, and cutting out an image along the obtained contour line,
at a start of cutout, the window frame being at a position including part of the contour line of the subject,
the program to be executed in a computer apparatus being for realizing in the computer apparatus an operating environment including the steps of:
reading and converting the image into image data;
obtaining a partial contour line of the subject in the window frame by binarizing the image data in the window frame among the image data obtained by conversion; and
determining a direction for moving the window frame based on the obtained partial contour line and moving the window frame along the determined direction.

A sixth aspect is directed to a method for supplying through a communication circuit a program for moving a window frame on an image along a contour of a subject and binarizing image data in the window frame to obtain a contour line of the subject, and cutting out an image along the obtained contour line,
at a start of cutout, the window frame being at a position including part of the contour line of the subject,
the program to be executed in a computer apparatus being for realizing in the computer apparatus an operating environment including the steps of:
reading and converting the image into the image data;
obtaining a partial contour line of the subject in the window frame by binarizing image data in the window frame among the image data obtained by conversion; and
determining a direction f or moving the window frame based on the obtained partial contour line and moving the window frame along the determined direction.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
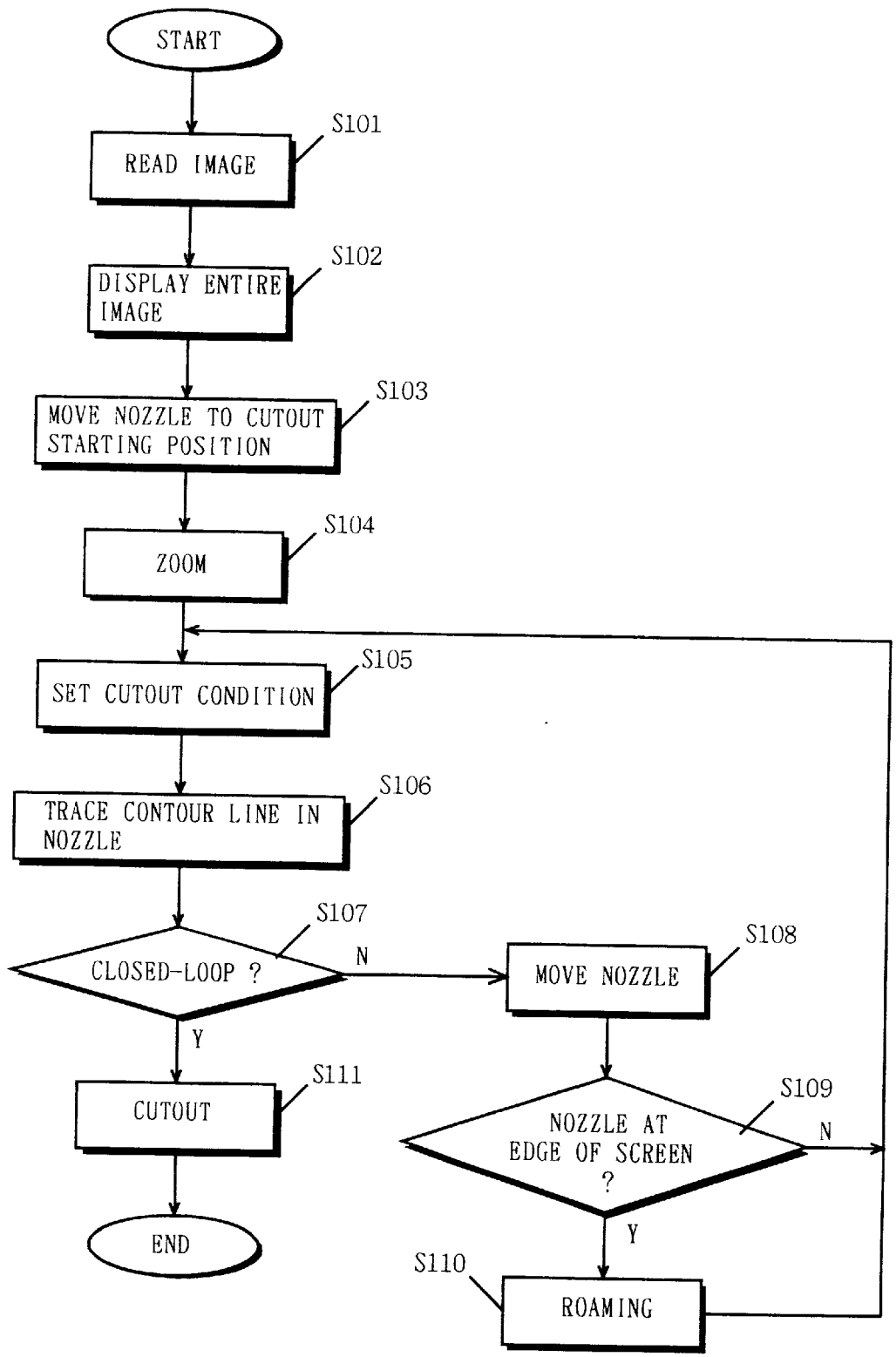
FIG. 1 is a flow chart showing an image cutout method according to an embodiment of the present invention.

Described below is a preferred embodiment of the present invention referring to the drawings.

Figure 2:
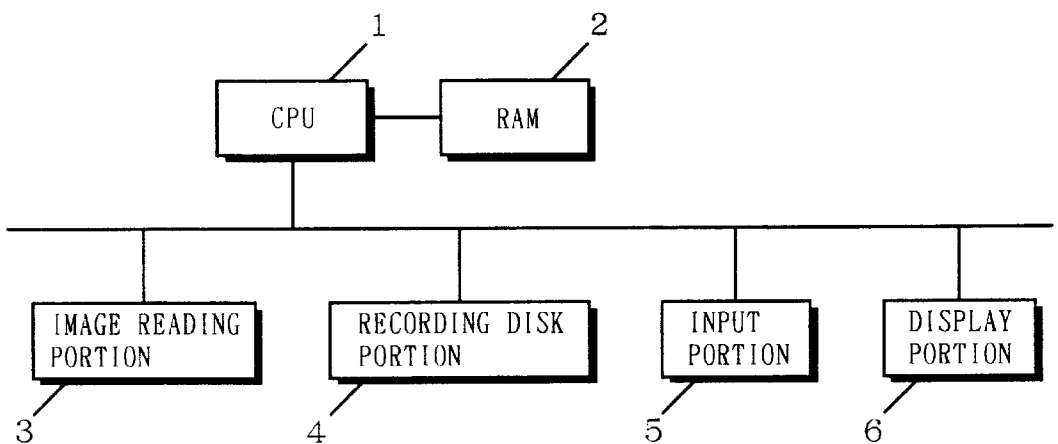
FIG. 2 is a block diagram showing an example of structure of an image cutout apparatus to which the method in FIG. 1 is adopted.

FIG. 1 is a flow chart showing an image cutout method according to an embodiment of the present invention, and FIG. 2 is a block diagram showing an example of structure of an image cutout apparatus to which the method of FIG. 1 is adopted. The apparatus of FIG. 2 includes a CPU 1, RAM 2, an image reading portion 3, a recording disk portion 4, an input portion 5, and a display portion 6.

The CPU 1 executes the image cutout method of the present invention. RAM 2 stores a program for executing the image cutout method of the present invention and storing data required for the execution. The image reading portion 3 includes a scanner, for example, and with the scanner, reads a photographic image to convert it to image data. The recording disk portion 4 includes a hard disk, for example, and stores the image data and the program in this hard disk. The input portion 5 includes a mouse and a keyboard, for example, and an operator operates the mouse and keyboard to input required data. The display portion 6 includes a display, for example, and the image data and an input screen are displayed on the display.

The above program is provided by being stored in a portable recording medium such as a floppy disk, a CD-ROM and the like. Alternatively, the program may be supplied through a communication circuit for the apparatus of FIG. 2. The provided or supplied program is once stored in the recording disk portion 4 (or may be initially stored in the recording disk portion 4), then transferred to RAM 2 and executed by the CPU 1.

Described below is image cutout operation by the apparatus of FIG. 2 using the flow chart of FIG. 1. An original photographic image from which a subject part is to be cut out is the same as that shown in FIG. 11. When the program is started, the operator first sets the photographic image of FIG. 11 in the image reading portion 3. The image reading portion 3 reads the set photographic image to convert it into image data (here, YMCK data) (step S101).

Figure 3:
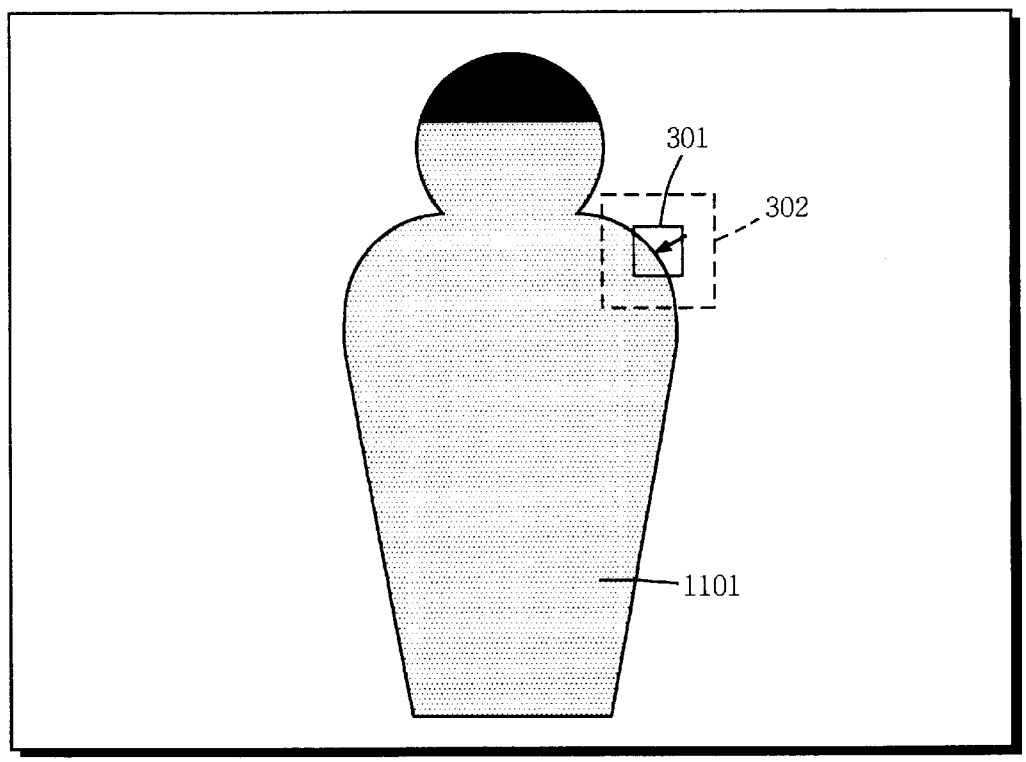
FIG. 3 is a diagram showing a state in which a nozzle 301 is moved to a cutout starting position (a position shown by an arrow in the drawing) in step S103 of FIG. 1.
Figure 11:
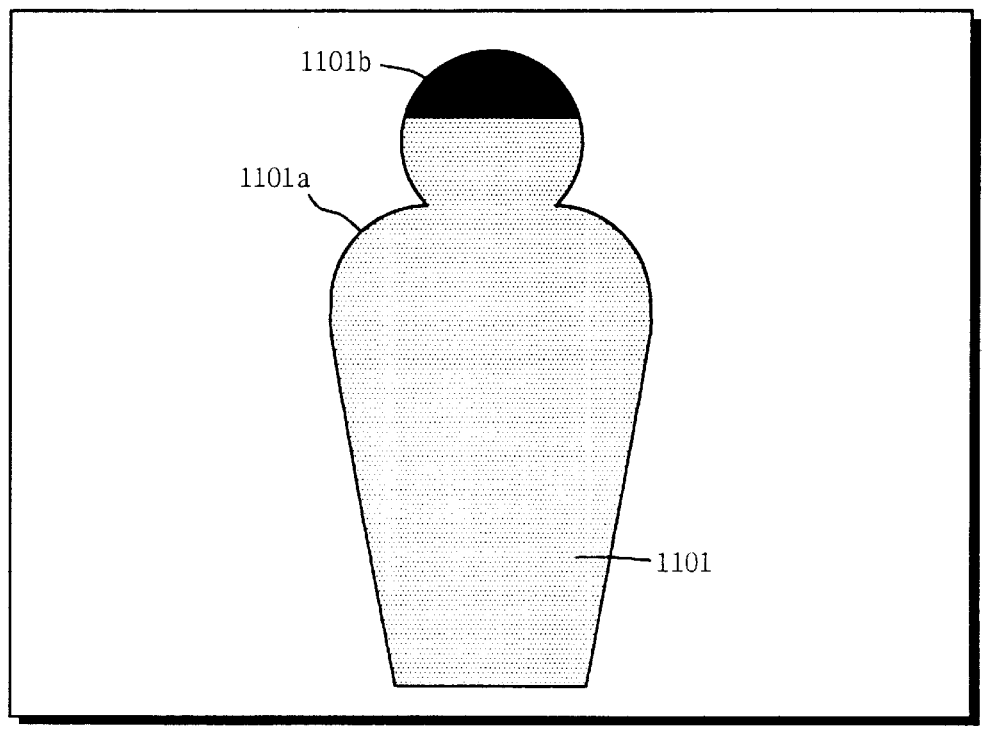
FIG. 11 is a diagram showing a photographic image including a subject 1101 to be cut out.
Figure 12:
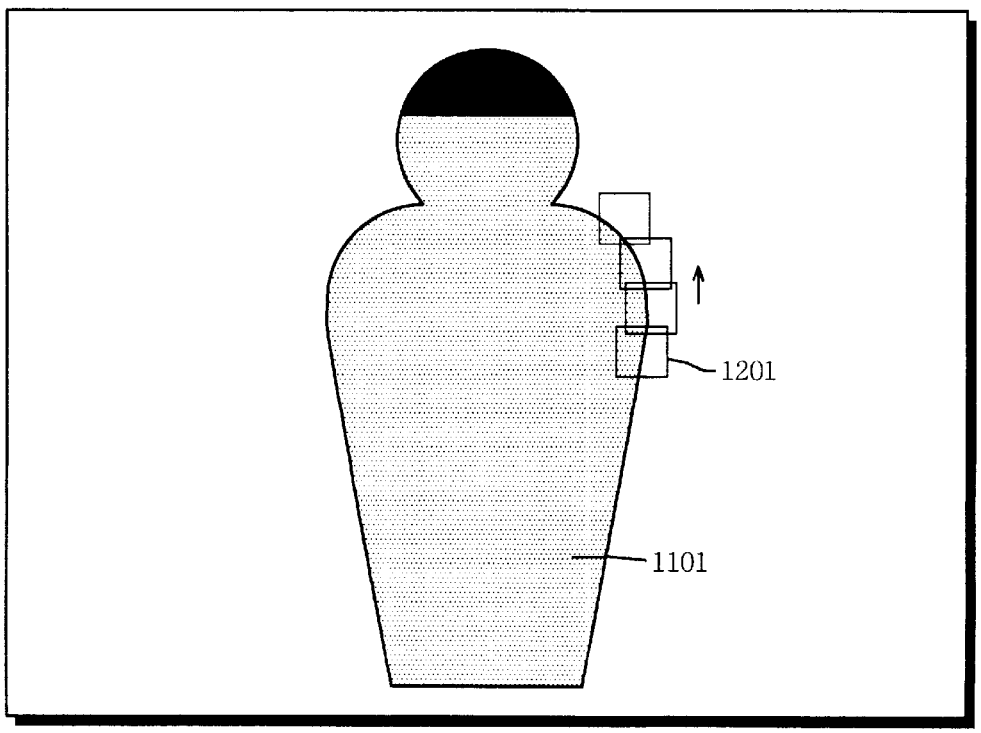
FIG. 12 is a diagram for describing an image cutout method (a conventional method) devised by the applicant.

The image data obtained by conversion in step S101 is once stored in the recording disk portion 4, then converted into image signals (here, RGB signals) in the display portion 6 and displayed on its screen (step S102). When the photographic image of FIG. 11 is displayed on the screen of the display portion 6, the operator operates the mouse of the input portion 5 to specify an arbitrary point on a contour line of the subject 1101 to be cut out as a cutout starting position (a position shown by an arrow in the drawing), as shown in FIG. 3.

In response, CPU 1 makes the nozzle 301 displayed on the screen and moves its center point to the specified cutout starting position (step S103). The nozzle 301 is a square frame of a predetermined size on the screen, for example, and data in the frame is subjected to binarization (described later).

Figure 4:
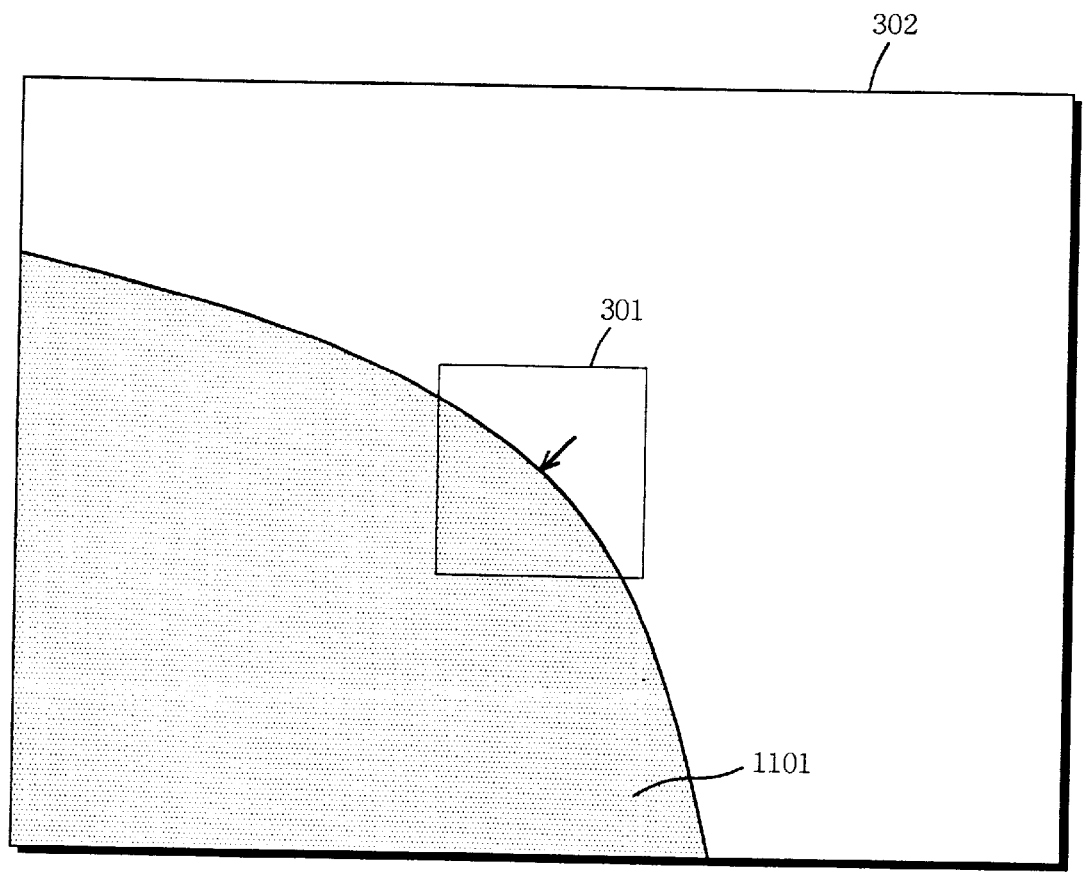
FIG. 4 is a diagram showing a state in which a zoom area 302 of FIG. 3 is zoomed-in in step S104 of FIG. 1.

Next, as shown in FIG. 4, the CPU 1 makes an area of a predetermined size on the screen including the nozzle 301 (an area shown by a dotted line in FIG. 3; hereinafter referred to as a zoom area 302) zoomed-in (step S104). The operator determines referring to the displayed screen (the zoom area 302) which color among Y, M, C, and K is appropriate for binarizing the image data in the nozzle 301, and then operates the mouse or the keyboard of the input portion 5 to input the determined color (hereinafter referred to as a reference color).

By the way, although the size of the nozzle 301 and the enlargement ratio of the zoom area 302 may be previously determined, it is preferable for both cutout accuracy and efficiency that as the shape of the contour of the subject 1101 to be cut out is complicated, the nozzle 301 is made smaller and the enlargement ratio is made larger and that as the shape is simple, the nozzle 301 is made larger and the enlargement ratio is made smaller. Therefore, when the reference color for binarization is inputted as described above, the size of the nozzle 301 and the enlargement ratio of the zoom area 302 may further be inputted.

In response, the CPU 1 sets the reference color inputted by the operator (the nozzle size and the enlargement ration may be added) as a cutout condition (step S105), and based on the condition, traces a partial contour line of the subject 1101 in the nozzle 301 (step S106). Tracing the contour line is performed as follows, for example. That is, the image data in the nozzle 301 is binarized with the reference color set in step S105, and (positional information of) a boundary line where the obtained bit map is on/off is obtained. Then, the obtained boundary line is traced as a contour line.

The CPU 1 determines whether (a line obtained by linking) the partial contour lines traced in step S106 forms a closed-loop (step S107). Then, when the determination result is positive, the CPU 1 goes on to step S111 (subject cutout processing; described later), and goes on to step S108 when negative.

The CPU 1 then moves the nozzle 301 to a predetermined distance along the contour of the subject 1101 (step S108). The processing which characterizes the present invention will be described later in detail and only the main point will now be described here.

The new image cutout method described in Related Art Statement section is that the operator operates a mouse to move the nozzle 301 along the contour of the subject 1101 (that is, roughly traces the contour of the subject 1101), while the system side binarizes the image data in the nozzle 301 to obtain the on/off boundary line, thereby tracing the accurate contour line of the subject 1101.

For automating the above processing of moving the nozzle 301 along the contour of the subject 1101, the CPU 1, unlike the operator, does not recognize which image data is the data of the subject 1101 and the data of the background. Therefore, in this case, it is impossible to move the nozzle 301 along the contour of the subject 1101. Thus, in step S108, based on the present partial contour line in the nozzle 301 traced in step S106, the CPU 1 presumes a direction of the contour line which is linked to the partial contour line, and moves the nozzle 301 (to the predetermined distance) along the direction obtained by the presumption.

Figure 5:
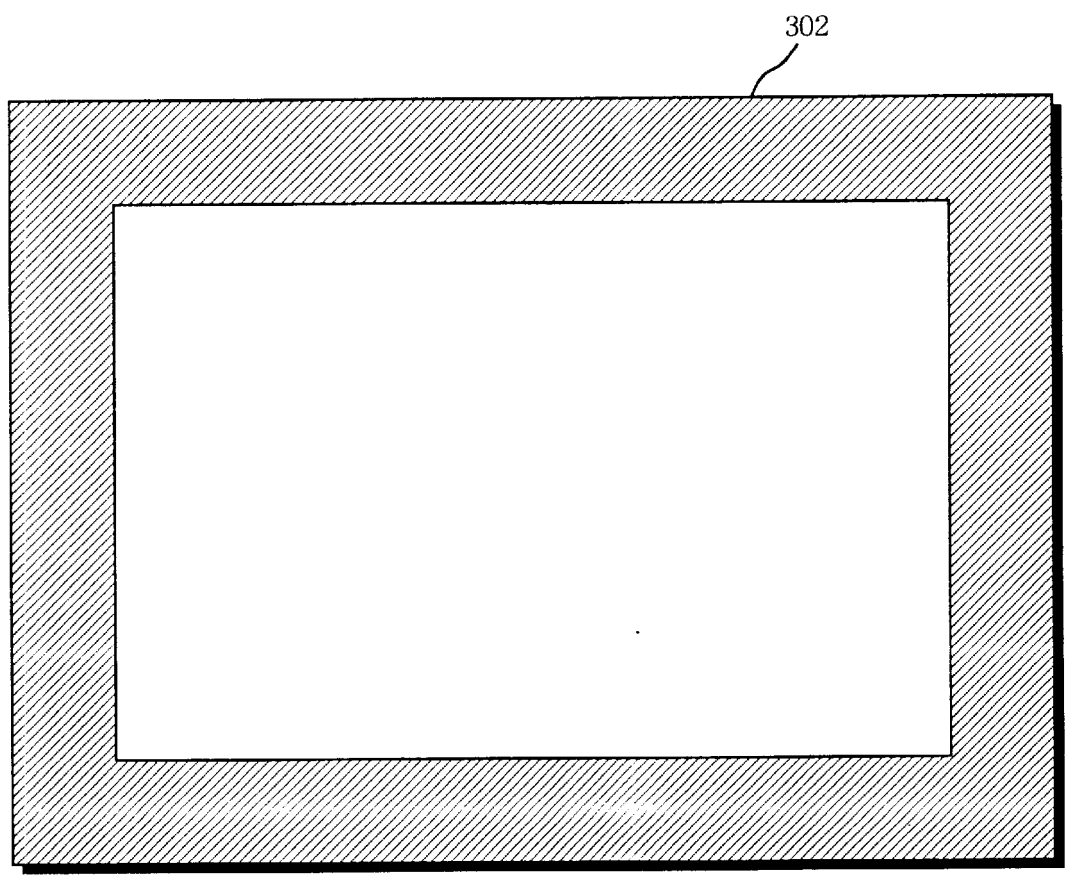
FIG. 5 is a diagram showing an edge area provided for determining whether or not the nozzle 301 is in the vicinity of an edge of a screen (the zoom area 302 of FIG. 4)

The CPU 1 then determines whether the nozzle 301 after movement is in the vicinity of an edge of the screen (the zoom area 302 of FIG. 4) (step S109). This determination is made, for example, by setting an edge area as shown by diagonal lines in FIG. 5 in the zoom area and determining whether the center point of the nozzle 301 after movement is in this edge area.

When the determination result is positive in step S109, the CPU 1 goes on to step S110, and when negative, returns to step S105 to repeat the above processing (that is, after changing the cutout condition as required, tracing a partial contour line in the nozzle 301 after movement and then presuming a direction of the partial contour line which is linked to the partial contour line to further move the nozzle 301 along the direction).

The CPU 1 moves the zoom area 302 to a predetermined distance along the contour of the subject 1101 (hereinafter referred to as roaming) (step S110). Also for automating this roaming, the same problem will occur as that described in step S108 as to the move of the nozzle 301 (the detail of step S110 will be described later). Then, the CPU 1 returns to step S105 to repeat the same operation described above.

A maximum value of the length of the contour line to be traced may be predetermined so that tracing processing stops when the length of the traced contour line reaches the maximum value. Further, when the operator can change the maximum value, tracing processing can stop at an arbitrary position. For example, when the subject 1101 of FIG. 11 is to be cut out, contour line tracing is first performed based on the color of the body part 1101a and then based on the color of the head part 1101b. Therefore, tracing processing has to stop on the boundary between the body part 1101a and the head part 1101b to change the reference color. At this time, the operator appropriately adjusts the maximum value so as to stop tracing processing in the vicinity of the boundary. After the stop, the operator changes the reference color and then restarts tracing processing. Thus, it is possible to cut out the subject 1101 without a hitch.

Then, when the curve obtained by tracing the partial contour lines obtained by linking in step S106 becomes a closed-loop, the CPU 1 extracts data in the closed-curve (the contour line of the subject 1101) from the recording disk portion 4 to "cut out" the subject image from the original photographic image (step S111). Then, the CPU 1 ends the processing.

Figure 6:
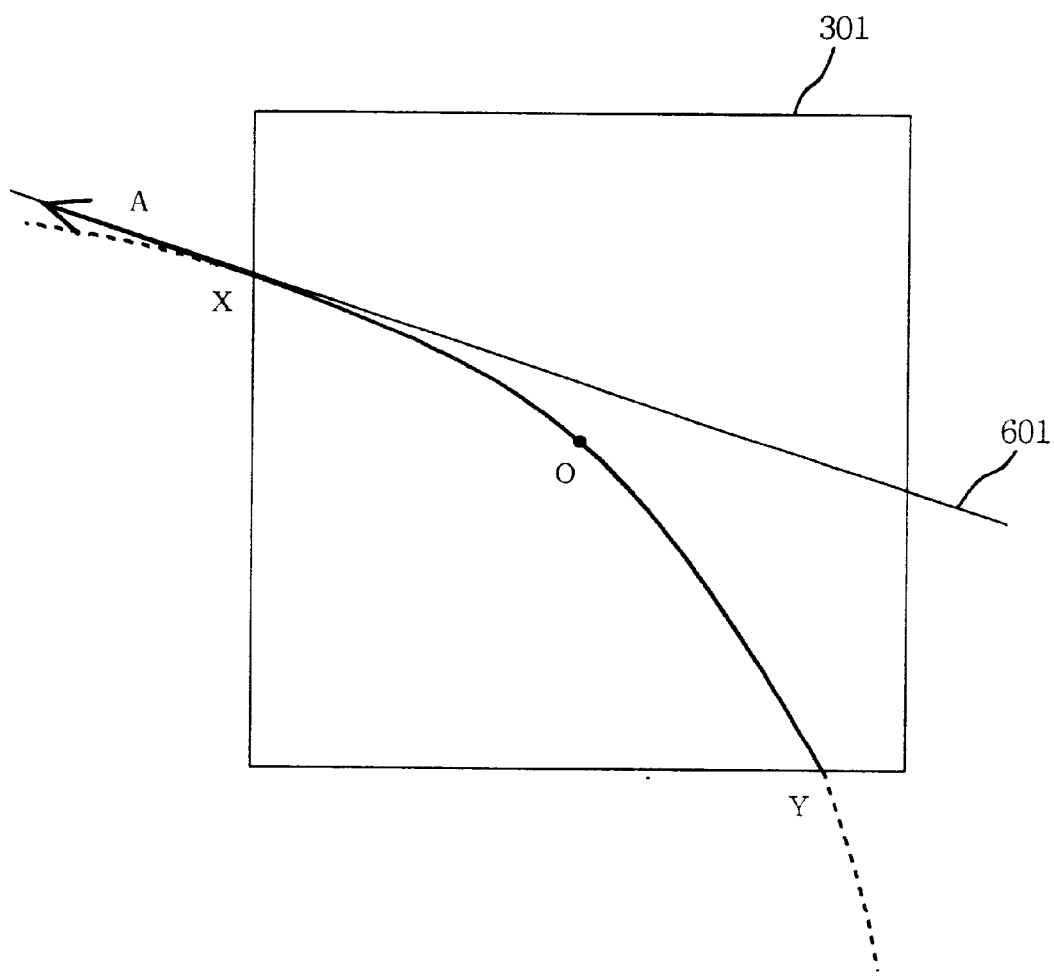
FIG. 6 is a diagram for describing an example of method for obtaining a moving direction of the nozzle 301 in step S108 of FIG. 1.

As to nozzle moving processing in step S108, the moving direction of the nozzle 301 can be obtained as follows. That is, in FIG. 6, a partial contour line (XOY) in the nozzle 301 is approximated by a quadratic curve passing through both contour line extreme points X and Y, for example, and a direction A of a tangent 601 at one extreme point X of the quadratic curve is obtained and taken as a moving direction of the nozzle 301. In this method (hereinafter referred to as a first method), it is possible to obtain the moving direction of the nozzle 301b more accurately. However, approximating processing with a quadratic curve and processing for obtaining a direction of a tangent are complicated and as a result it is assumed to take much time to perform the processing.

Figure 7:
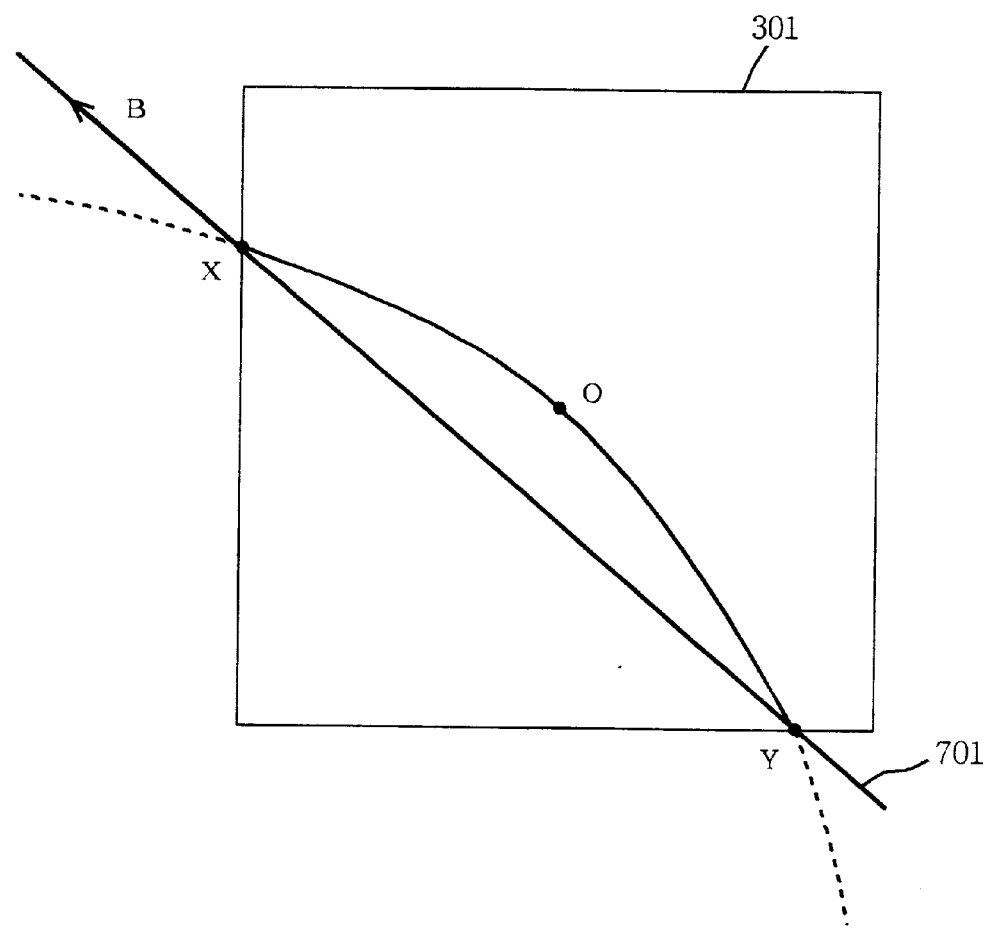
FIG. 7 is a diagram for describing another example of method for obtaining the moving direction of the nozzle 301 in step S108 of FIG. 1.

Further, as shown in FIG. 7, it is possible to move the nozzle 301 along a direction B of a straight line 701 passing though both of the extreme points X and Y of the contour line (XOY). Although the processing of this method (hereinafter referred to as a second method) is simpler than that of the above first method, accuracy of the moving direction of the nozzle 301 extremely deteriorates at a part where the curvature of the contour line (XOY) of the subject 1101 is large.

Figure 8:
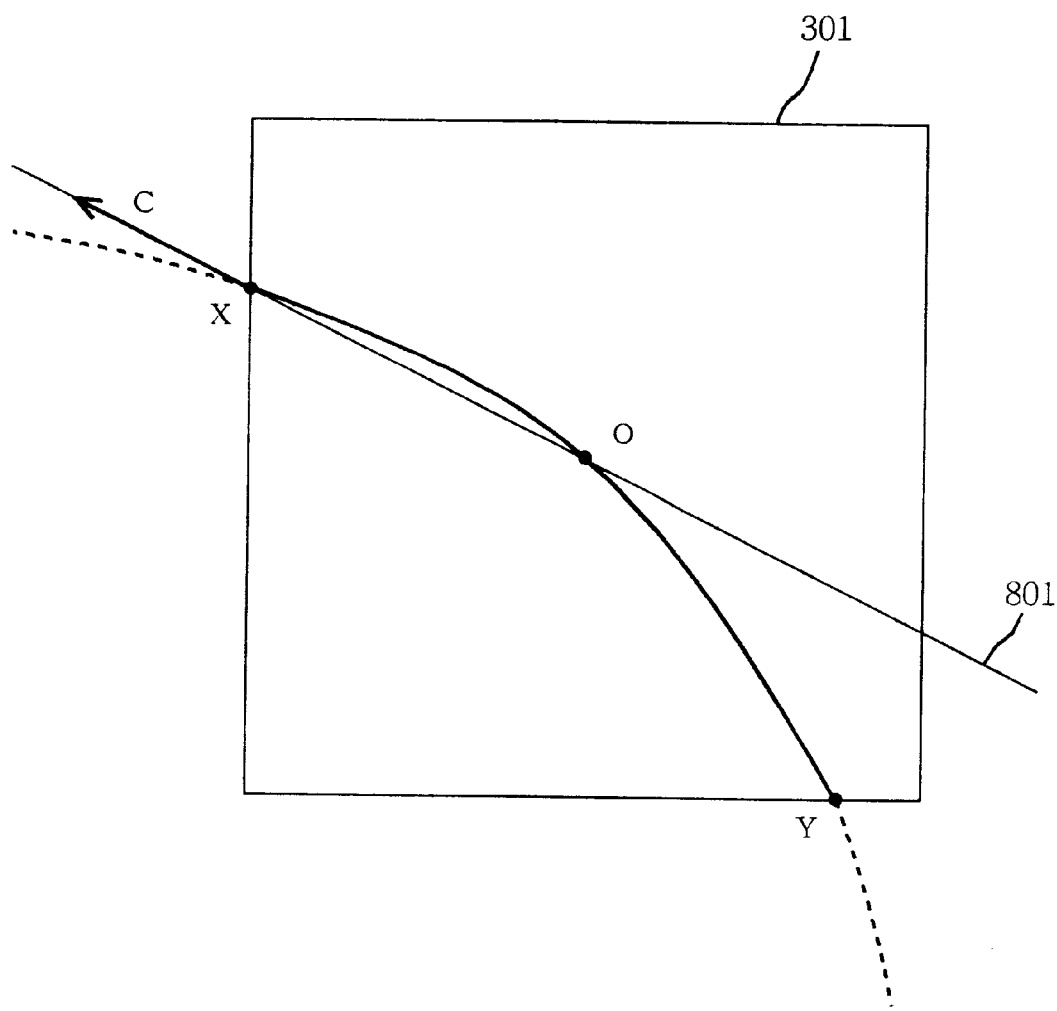
FIG. 8 is a diagram for describing still another example (in the preferred embodiment, this example is adopted) of method for obtaining the moving direction of the nozzle 301 in step S108 of FIG. 1.

Therefore, in the present embodiment, as shown in FIG. 8, the nozzle 301 is moved along a direction C of a straight line 801 passing through the center point O of the nozzle 301 and one extreme point X of the contour line (XOY). When the size of the nozzle 301 is the same as that of the second method, as known by comparing FIG. 7 with FIG. 8 each other, this method (hereinafter referred to as a third method) has higher accuracy of the moving direction than the above second method (that is, it is possible to obtain a value more approximate to the direction A obtained by the above first method).

Figure 9:
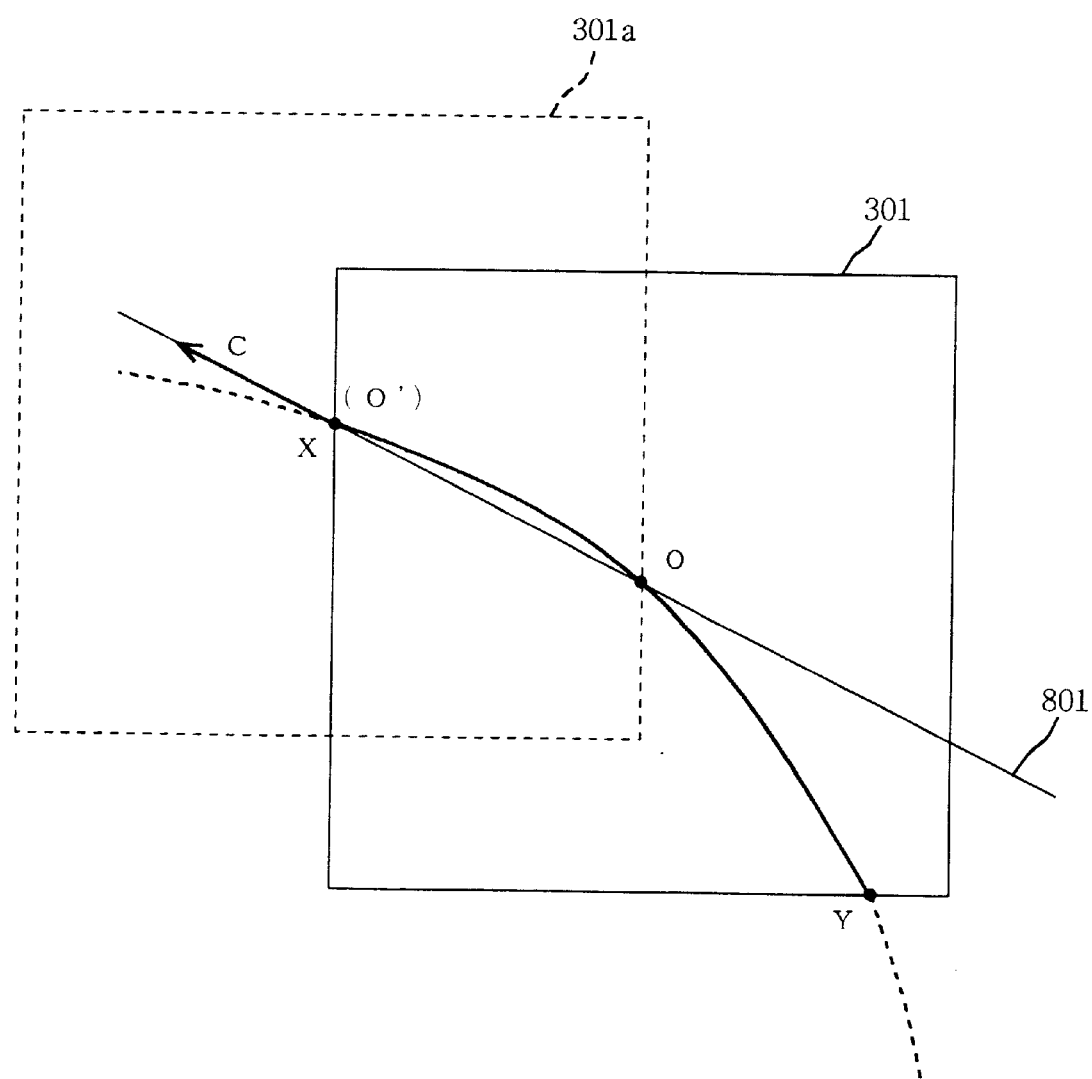
FIG. 9 is a diagram showing a state in which the nozzle 301 is moved in step S108 of FIG. 1.

Further, at that time, as shown in FIG. 9, for example, when the nozzle 301 is moved so that a center point O' of the nozzle 301a after movement coincides with one extreme point X of the contour line (XOY) in the nozzle 301 before movement, no coordinate calculation is required for obtaining a new nozzle position.

Figure 10:
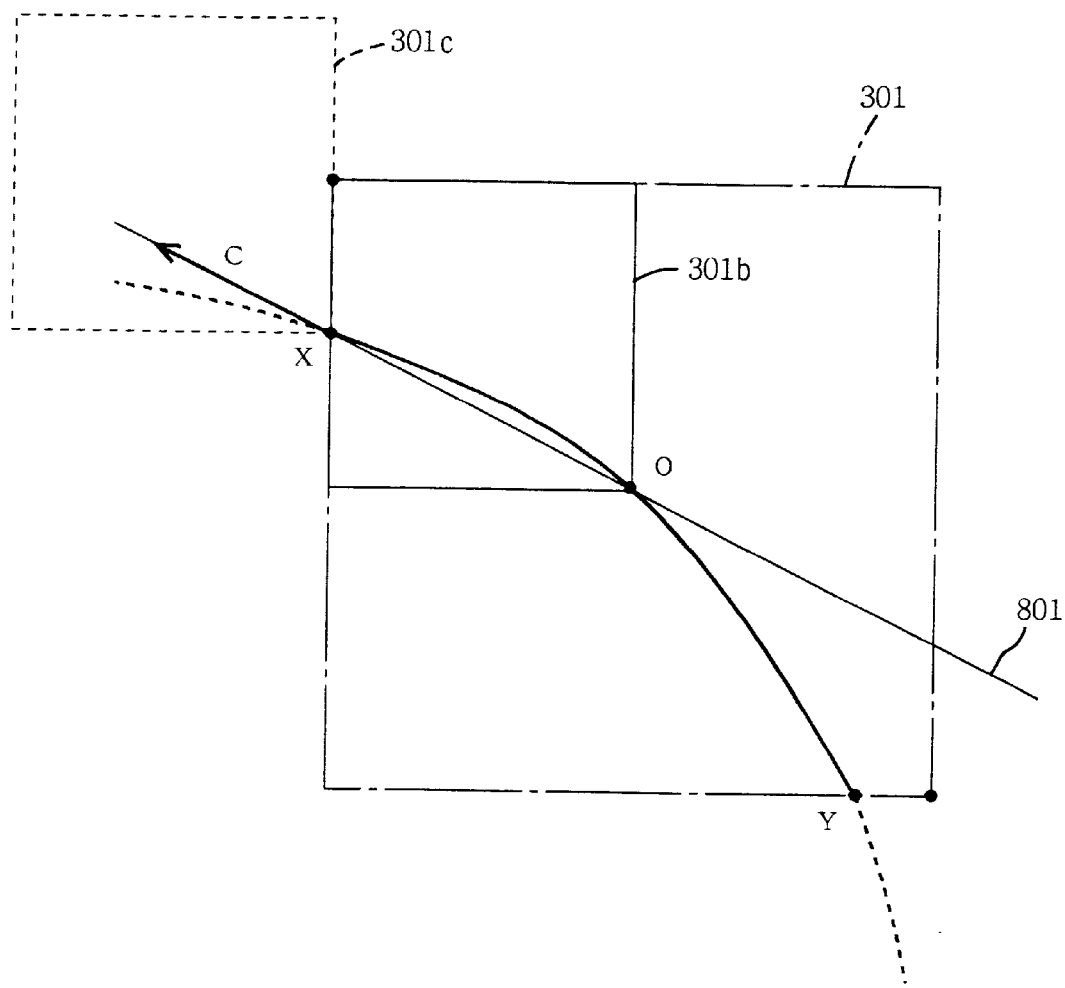
FIG. 10 is a diagram showing a state in which a nozzle 301b (which is obtained by cutting each side of the nozzle 301 in half) is moved in step S108 of FIG. 1.

In the above second method, when the length of each side of the nozzle 301 is cut in half (a nozzle 301b of FIG. 10), it is possible to obtain approximately the same accuracy of the moving direction as that in the above third method. For example, as shown in FIG. 10, the nozzle 301b before movement is moved so that part of one extreme point O of the contour line (XO) of the nozzle 301b is at a position of the other extreme point X (a frame shown by a dotted line in the drawing is a nozzle 301c after movement), and thereby no coordinate calculation is required for obtaining a new nozzle position. That is, in step S105, when the size of the nozzle 301 is arbitrary set, the above second method may be adopted.

Further, in the present embodiment, the nozzle 301 is displayed on the display of the display portion 6 and the operator determines the cutout condition (for example, the reference color) referring to the display. However, when the apparatus of FIG. 2 automatically determines the cutout condition, the nozzle 301 does not have to be displayed.

As to roaming processing in step S110, in the same manner as that of obtaining the moving direction of the nozzle 301 in step S108, the moving direction of the zoom area 302 can be obtained. That is, in FIG. 8, when the nozzle 301 is taken as the zoom area 302, the zoom area 302 is moved along the direction C of the straight line 801 passing through the center point O of the zoom area 302 and one extreme point X of the partial contour line (XOY) in the zoom area 302. At that time, as shown in FIG. 9, for example, when the zoom area 302 is moved so that the center point O' of the zoom area 302a after movement (corresponding to the nozzle 301a after movement) coincides with one extreme point X of the contour line (XOY) of the zoom area 302 before movement, no coordinate calculation is required for obtaining a new zoom area position.

While the invention has been described in detail, the foregoing description is in all aspects illustrative and not restrictive. It is understood that numerous other modifications and variations can be devised without departing from the scope of the invention.

What is claimed is:

1. A method for moving a window frame on an image along a contour of a subject and binarizing image data in the window frame to obtain a contour line of the subject, and cutting out an image along the obtained contour line, at a start of cutout, said window frame being at a position including part of the contour line of said subject, the method comprising the steps of:

reading and converting said image into image data;

obtaining a partial contour line of said subject in the window frame by binarizing the image data in said window frame among the image data obtained by conversion; and finding a straight line which passes through at least one extreme point of the obtained partial contour line and automatically moving the window frame along a direction of the straight line.

2. The image cutout method according to claim 1, wherein at the start of cutout, said window frame is on the contour line of said subject, and at the time of moving said window frame, the window frame is moved so that a center point of said window frame after movement is on one extreme point of the obtained partial contour line.

3. The image cutout method according to claim 1, further comprising the steps of:

zooming a partial area of said image including a part on which said window frame is put; and determining a direction for moving the zoom area based on the obtained partial contour line and moving the area along the determined direction.

4. An image cutout apparatus for moving a window frame on an image along a contour of a subject and binarizing image data in the window frame to obtain a contour line of the subject, and cutting out an image along the obtained contour line, at a start of cutout, said window frame being at a position including part of the contour line of said subject, the apparatus comprising:

image reading means for reading and converting said image into image data;

partial contour obtaining means for obtaining a partial contour line of said subject in the window frame by binarizing image data in said window frame among the image data obtained by reading by said image reading means; and window frame moving means for finding a straight line which passes through at least one extreme point of the obtained partial contour line and automatically moving the window frame along a direction of the straight line.

5. A record medium of recording a program for moving a window frame on an image along a contour of a subject and binarizing image data in the window frame to obtain a contour line of the subject, and cutting out an image along the obtained contour line, at a start of cutout, said window frame being at a position including part of the contour line of said subject, the program to be executed in a computer apparatus being for realizing in said computer apparatus an operating environment including the steps of:

reading and converting said image into image data;

obtaining a partial contour line of said subject in the window frame by binarizing the image data in said window frame among the image data obtained by conversion; and finding a straight line which passes through at least one extreme point of the obtained partial contour line and automatically moving the window frame along a direction of the straight line.

* * * * *